Figure 14:

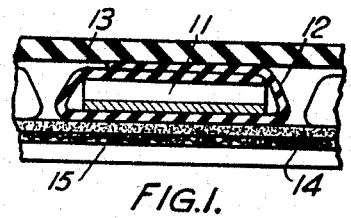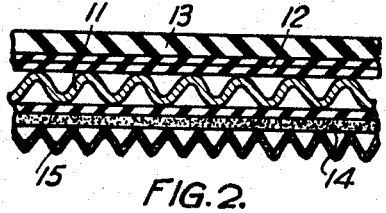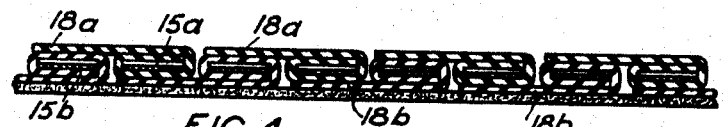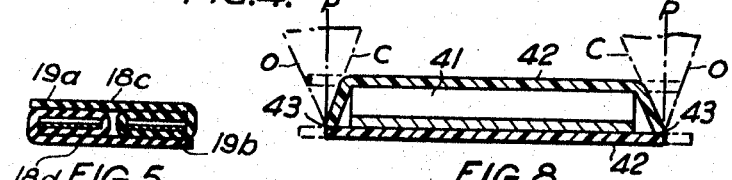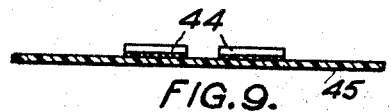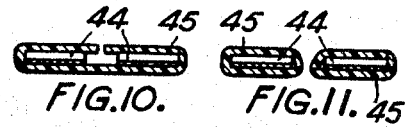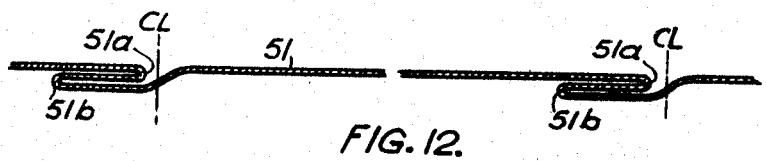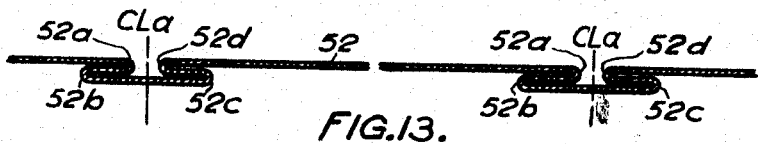

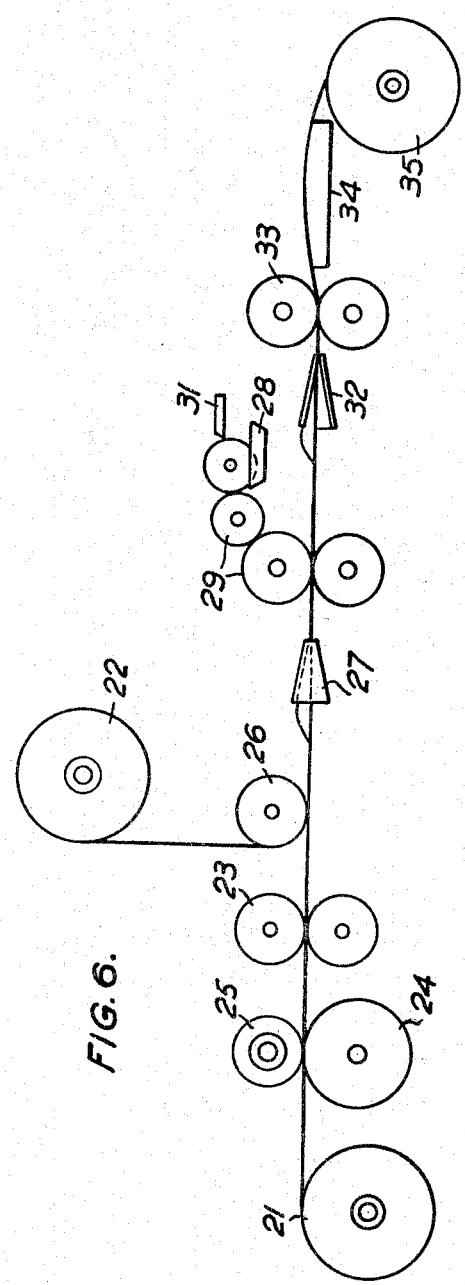
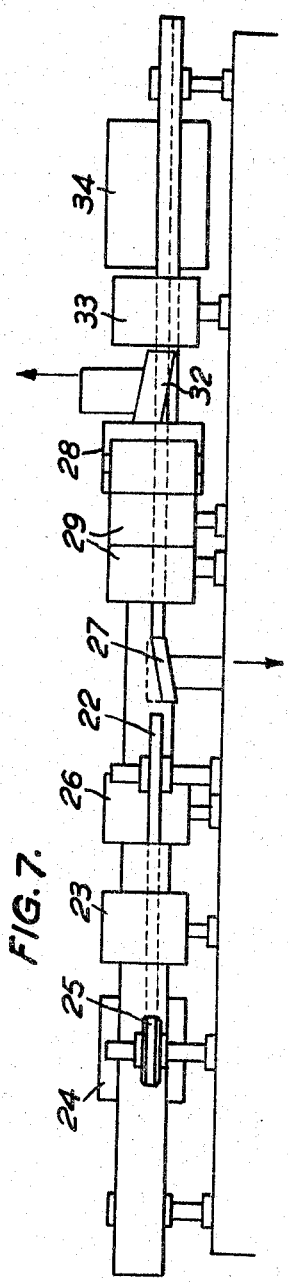

May 2, 1967 P. EISLER 3,317,657
FLAT ELECTRIC CABLES
Filed Dec. 12, 1960 4 Sheets-Sheet 3

INVENTOR
Paul Eisler
BY
ATTORNEY.

May 2, 1967  P. EISLER  3,317,657
FLAT ELECTRIC CABLES
Filed Dec. 12, 1960  4 Sheets-Sheet 4

Inventor
Paul Eisler
By G. H. Emery
Atty.

United States Patent Office 3,317,657
Patented May 2, 1967

3,317,657
FLAT ELECTRIC CABLES
Paul Eisler, 57 Exeter Road, London, England
Filed Dec. 12, 1960, Ser. No. 75,453
Claims priority, application Great Britain, Dec. 11, 1959, 42,253/59
6 Claims. (Cl. 174—117)

The present invention relates to electric cables and heating films consisting of parallel strands of metal foil for conducting electric current and thin insulating substances surrounding these foil strands and joining them into a thin flat flexible structure of desired width. It is concerned with the provision of the essential insulating of the foil strands with thin flexible insulating films of plastic, paper or textile and comprises a novel structure of the flat cable or a heating film constituted thereby as well as methods and means for the production of this structure. Any insulated foil-strand in the cable may have a potential difference from its neighbour. If the strand itself is split into narrower or thinner strips not necessarily insulated from each other, they may still form, for the purpose of this specification, a single strand, in other words a strand may be of single or multi-section construction.

A number of flat cable and heating film constructions are well known or are the subject of my patents Nos. 3,020,378, 3,026,234, and 3,033,970 and my co-pending applications Nos. 749,554, filed July 18, 1958, and 789,221, filed Dec. 29, 1958.

They incorporate metal foil strands which are insulated by a type of enamel as used for insulating wire, by embedding the foil strands in a plastic substance by extrusion, by producing them spaced from each other by stamping, by coating the foil strands with resinous powder which is subsequently fused, by weaving, sewing laminating or sticking the foil strands on or between flexible insulating films etc.

All these constructions, however, cannot fully satisfy the requirements of nearly universal applicability in one or more aspects for reasons inherent in their structure and the consequent method of production.

For example: Coating the foil strands with an enamel or a subsequently liquified powder often fails to provide a uniform, pinhole-free insulation, particularly on the edges of the foil which may have burrs; surrounding foil strands by a plastic mass before the latter is solidified requires relatively wide spacing of the foil strands without excluding the danger of insulation breakdown through bubbles or other imperfections developing during the solidification of the plastic; weaving or sewing do not give protection against humidity, or corrosion, etc.

It has been proposed to use a preformed insulation of paper or the like between two layers of which foil strands are sandwiched, the two layers being secured to the foil and together between the foils by adhesive. In developments adjacent strands were additionally separated by a paper or like strip passing from top to bottom or bottom to top between them, or each strand has wrapped in a separate paper or like wrapper or two adjacent strands were wrapped in one wrapper which passed between them or the two outer of three strands were wrapped in one wrapper which passed between the inner strand and the two outer strands, the separating strips or wrappers in all cases being secured continuously by adhesive to at least one paper or like strip uniting the wrapped assemblies side by side into a flat cable. A feature common to all these structures was that the foil strands are continuously and firmly held to the insulation.

Such a structure is relatively flexible in a direction perpendicular to the plane of the cable, i.e. the cable could be wound up into a roll for storage though even such winding up can impose quite severe and possibly damaging stresses to various components of the structure. Manifestly the structure has no flexibility at all in its own plane. In addition such a structure cannot accommodate differential expansion between the metal foil and the insulation with changing temperature and the tensile stresses in the foil strands arising with temperature changes in the one direction may easily tear the foil especially if there is any lack of uniformity in the structure itself or in the temperature distribution across the section of the structure leading to the stress being highest at one edge of a strand. It suffers under the further disadvantage that mechanical stresses from outside are transferred to the foil and render it liable to be torn in handling.

The present invention enables the advantages of a preformed insulating film of which pinhole-free insulation and desired mechanical properties such as high tensile strength or elasticity are particular features to be obtained while providing a substantial degree of flexibility in all directions together with the ability to accommodate the different coefficients of thermal expansion between the insulating film and the conductive strands. The present invention also has further advantages which will be pointed out or become apparent as the description proceeds.

The flat cable according to the present invention comprises at least one layer of a plurality of parallel longitudinal strands each being a thin flexible flat conductor, each of which is enveloped by a sheath of prefabricated thin flexible insulating material so that the total width of the material constituting the sheaths is at least twice the total width of the conductor strands, the several sheaths being joined together but the conductor strands being free from adhesion to the sheaths at least over a major part of the surface of the conductor strands, any zones of adhesion of the strands to the sheaths being so short as not to impede substantially the flexibility of the cable in its own plane and being at a spacing at least equal to that which would suffice to prevent any adjacent conductor strips, if they were not enveloped, from making contact with one another when the cable is flexed in its own plane to its limit of endurance, so that the strands and sheaths have a substantial degree of relative mobility in the longitudinal direction. In further explanation of the last specified feature in general it would be preferable to avoid any zones of adhesion, but it may be necessary or desirable to provide zones of adhesion at intervals for manufacturing reasons or convenience in handling. It will be clear that if any zone of adhesion is long, over that zone difficulties will arise both as regards the accommodation of differential thermal expansion and flexing of the cable in its own plane, but if any such zone is short practical difficulties on either score disappear. Again if zones of adhesion are at short intervals, if an attempt to flex the cable in its own plane is made it can only flex as a single beam i.e. the strands on one side will be wholly in tension and those on the other wholly in compression. Not only does this make the structure stiff but imposes quite a small limit before either the insulating film or the strands in tension actually fail. This would still apply even if the strands were not enveloped but simply secured by adhesive at intervals to a film or between two films. As the zones of adhesion are spaced further and further apart the resistance to flexing in the plane of the cable and the direct stresses decrease, and when the spacing is high enough each strand would flex independently in its own plane. With such independent flexing, between the zones of adhesion the strands would shift laterally and at a certain spacing of the zones of adhesion the adjacent strips would make contact with one another before they or the insulation had been flexed to the limit of endurance i.e. before it or they failed. At any less spacing contact would not occur before either the insulation or the strands or some of them failed, at any greater spacing contact could occur. It is this spacing which is the minimum in a cable within the scope of the invention.

With elastomeric materials chosen for the insulating film, the film has greater flexibility than the strands and the strands would reach their limit of endurance before the film. More usually however with a crimped strand as is preferred, and a plastic or textile film, the film will reach the limit of endurance before the strands.

It will be understood that in fact contact will not occur when the cable of the invention is flexed in its own plane to the limit of endurance, because in fact each strand is separately enveloped in a sheath of insulating film, nevertheless it is this spacing of the zones of adhesion (which can be ascertained by practical tests with the materials used or can be calculated in advance from the parameters of the materials and dimensions) which constitutes one of the characteristics of the cable according to the invention.

With this spacing there is no doubt that adequate longitudinal mobility will be present to accommodate differential thermal expansion. Preferably the strands are crimped that is to say bent into small undulations perpendicular to the mean surface of the conductor with the crimps running transverse generally at right angles to the longitudinal direction and without substantially changing the original foil thickness by localized thinning or thickening. This gives the strands greatly increased elasticity in the plane of the cable making them to some degree extensible in the longitudinal direction and enables a cable made with crimped metal foil conductors to flex in its own plane to a reasonable radius so far as the insulating film will allow. The crimping gives the foil extensibility and flexibility in all directions whereas the uncrimped foil is only flexible in a direction perpendicular to its surface. The crimping also assists in accommodating thermal expansion without local buckling or other deformations, as well as having other advantages which will be described later.

The insulating film may be a plastic, an elastomer, paper or textile including glass and quartz fibre tape and since it is prefabricated it can be chosen, treated and tested prior to the enveloping operation so that there is certainty about the product being in accordance with specified requirements at least up to the enveloping operation. The specified requirements can be more severe than for insulating material in other form, such as foil coating- or embedding media, in so far as the quality of the corresponding film is higher. Plastic film, for instance, is often produced with the assistance of stretching and molecular orienting procedures conferring on it much better mechanical properties than a coating or extrusion of the same substance can have. Plastic film produced by specialized machinery is usually freer from pinholes and other imperfections, is of greater uniformity and has better surface qualities than the corresponding coating— and for some films there is not even a corresponding coating available.

Though as above mentioned paper or textile material can be used for the insulating film, plastic films are particularly suitable. One very suitable plastic film is a very thin polyester plastic film available under the trade name of "Melinex," but other materials can be used. Cost and convenience of supply are the main factors governing a choice among the plastic insulating films which endure a moderately high temperature. Otherwise fluorine-containing films (P.T.F.E. etc.) are generally preferable. Polycarbonate-, polypropylene- and nylon films are alternatives to the polyester film while polythene and polyvinyl-chloride films are obvious choices for a lower temperature range. The conductive strands may be either a highly conductive foil, such as copper or aluminum if the flat cable is for use as a current conductor of relatively low ohmic resistance, or a foil of brass, steel, lead, cupro-nickel, nickel-chrome or other resistance alloy if the flat cable is for use as a heating element dissipating its ohmic loss for heating purposes.

Instead of metallic foils, sprayed or deposited conductor strips, graphite or carbon films may be used in certain circumstances, for instance when very high resistance values are needed. Also plastic films in which ultra-fine metallic powders have been dispersed may be used, if and when the economic conditions justify the use of such resistor materials.

The foil used for highly conductive flat cables may be tinned on one or both sides continuously so that soldered connections can be made at any point. If however the foil is of higher resistive metal or alloy and the cable is used as a heating film the foil is preferably tinned at certain places and on one side only. The tinned places are the areas at which terminal connections are made or bridge pieces attached to produce a desired conductive pattern. Instead of tinning, plating or other suitable treatment for facilitating temporary or permanent connection may be employed.

As above mentioned the foil is preferably crimped. The crimps may be produced by running the foil through crimping rollers or between rubber- or other elastic bands which shorten the foil length held between them and force the foil into undulated form, so as to take up its reduction in length. The difference between the speed of the foil entering the crimping device and the speed with which it emerges is a measure of the crimping achieved and a measure of the extensibility imparted to the foil by this crimping.

Figure 15:
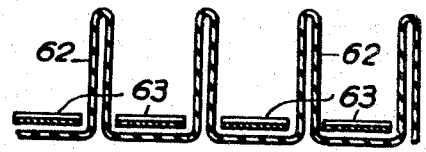
Figure 17:
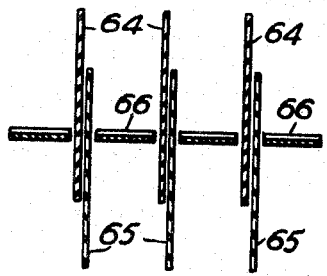
Figure 16:
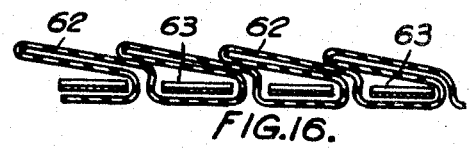
Figure 18:
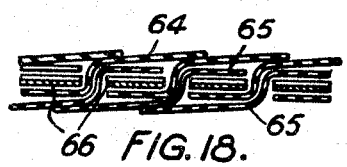
Figure 19:
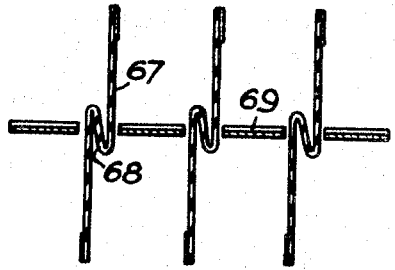
Figure 20:
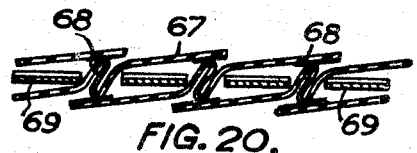
Figure 21:
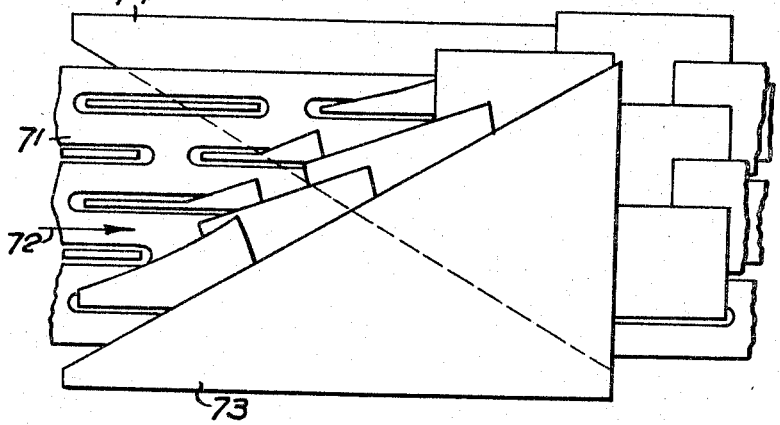
Figure 22:
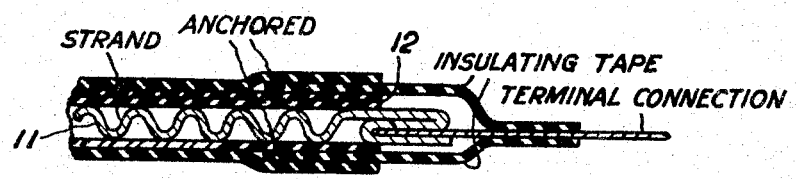
Figure 23:
Figure 24:
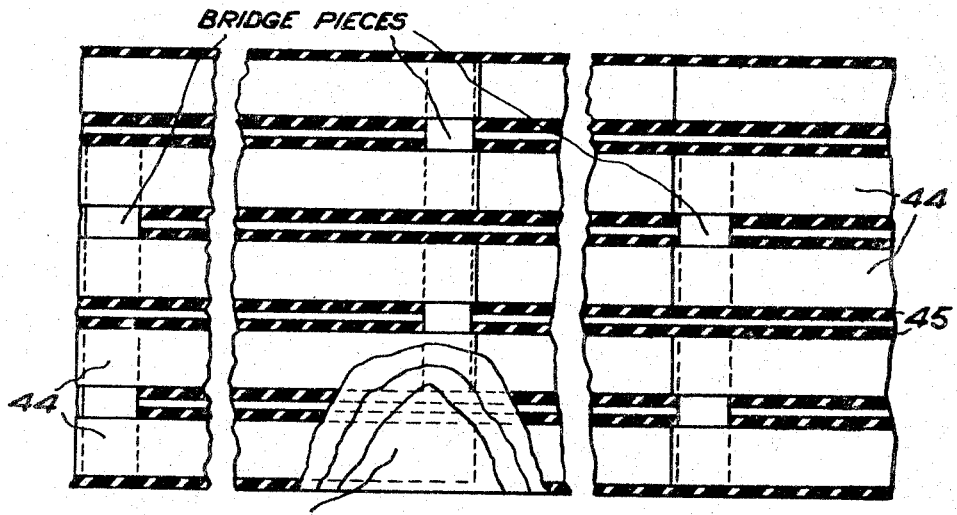

The invention will be further described with reference to the accompanying drawings in which:

FIGURE 1 is a cross section of part of a first embodiment of flat cable according to the invention, FIGURE 2 is a longitudinal section of any of the embodiments of which cross sections are shown in FIGURES 1, 3, 4 and 5, FIGURE 3 is a cross section of a part of a second embodiment of flat cable according to the invention, FIGURE 4 is a cross section of part of a third embodiment, FIGURE 5 is a cross section of part of a fourth embodiment, FIGURE 6 is a side view and FIGURE 7 a plan view of the essential elements of a machine or part of a machine for enveloping a single strand in the production of such cables as are illustrated in FIGURES 1 to 5, FIGURE 8 is a cross section of part of a fifth embodiment of flat cable according to the invention, FIGURES 9 and 10 are cross sections illustrating steps in the production of a sixth embodiment part of which is shown in cross section in FIGURE 11, FIGURE 12 is a longitudinal section showing provision for cross sections, FIGURE 13 is a longitudinal section of an alternative to FIGURE 12, FIGURE 14 is a cross section of a modification of FIGURE 1, FIGURE 15 illustrates in cross section a step in the production of a seventh embodiment part of which is shown in cross section in FIGURE 16, FIGURE 17 illustrates in cross section a step in the production of an eighth embodiment part of which is shown in cross section in FIGURE 18, FIGURE 19 illustrates in cross section a step in the production of a ninth embodiment part of which is shown in cross section in FIGURE 20, FIGURE 21 is a plan view of part of an apparatus used in the production of embodiment such as those shown in FIGURES 16, 18 and 20, FIGURE 22 is a longitudinal section illustrating one form of terminal connection to one of the conductors of a cable according to the invention, FIGURE 23 is a longitudinal section illustrating the local securing of a conductive strand to the insulating sheath, and FIGURE 24 is a plan view partly in section with some parts broken away of a heating cable produced from the embodiment of FIGURES 9, 10 and 11.

In all the figures the thicknesses have been shown exaggerated and in some cases the parts slightly distorted for the sake of clearness. Also only a few adjacent strands are shown or even only one strand without any limitation being implied. It will be equally understood that the invention is not limited to structures which come under the term "tape cables" by which is understood a cable not exceeding two inches wide though for convenience the invention will mainly be described with reference to tape cables.

For convenience of this description the flat cables according to the invention may be divided into two main classes, those in which the parallel conductor strands are electrically separate from one another except for terminations or interconnections made after the strands have been enveloped in their insulating sheaths, and those in which the parallel strands are electrically linked at regular intervals by bridges which may either be integral or be joined to the strands and which form with the strands a pattern which is mechanically coherent before the strands are enveloped in their insulating sheaths. Many of the features and structures described below are common to both classes.

In the structures illustrated the foil strands are shown all of equal width and all equally spaced without implying any such limitation on the scope of the invention. In FIGURE 1 each strand 11 is enveloped in a sheath 12 of insulating film which in the flat is between two and three times the width of the strand. It is folded over each edge of the strand and the margins are overlapped and preferably secured together (but not to the strand) by adhesive or welding. The sheaths 12 themselves are secured by adhesive or welding to a wide insulating film 13 which unites the whole into a flat cable. Although the strands are not secured to the sheaths (except possibly at terminations and cross-connections, and occasional intermediate zones as illustrated in FIGURE 23) they are completely insulated from outside contact, and they are insulated from one another at adjacent edges by two thicknesses of the insulating film.

The face of the cable opposite the wide film 13 may have a coating 14 of pressure sensitive adhesive to enable the cable to be secured to a support when in use, and during storage the adhesive may be covered with an easily stripped protecting layer 15 for instance of crepe paper. Obviously the wide film 13 might be on the opposite side to the overlapped margins of the sheaths or there may be a wide film on both sides. The wide film or films may be provided with the pressure sensitive adhesive.

As above mentioned the strands are preferably crimped and this is shown in the longitudinal section FIGURE 2.

Another structure in which a wide supporting film is not essential though it can be used is shown in FIGURE 3. Here each strand 15 is enveloped in a sheath 16 made from an insulating film of a little more than three times the width of the strand, folded so that one margin 17 first folds over one edge of the strand while the other 18 forms a leg projecting beyond the other edge of the strand and can thus serve to secure each sheath to its neighbour. A welded or adhesive joint is made with the leg 18 to the next sheath, and a similar joint is preferably made between the margin 17 and the overlapping part of the same sheath.

A structure with projecting legs of film which is preferred to that of FIGURE 3 is shown in FIGURE 4. Here the projecting legs 18a, 18b of alternate sheaths project to the left and on top and to the right and below. To this end alternate strands 15a, 15b are wrapped in opposite directions. Further the folded margin of each sheath lying next to the foil strand is the full width of the strand. Thus in this example there are two layers of insulating film on both faces as well as between adjacent edges of the strands.

This is achieved with a width of insulating film of about four times the width of a strand, neglecting thickness and folding allowances. The spacing between neighbouring foil strands can be a minimum comprising two film thicknesses plus the clearance allowed for folding the wrappings of film and joining the neighbouring strands.

Nevertheless, it is quite easy to slit the cable of FIGURE 3 or FIGURE 4 between neighbouring strands by just cutting the leg of the film forming the link to the neighbouring sheath without having to cut through the whole thickness of the cable with the cutting knife. This feature avoids damage to the cable, permits easy separation and bending out of one or more strands from the multi-core cable and the bridging of the slit, slot or gap thus made in the cable by a single adhesive tape during or after the cutting. It equally helps in joining or splitting flat cables along their length in production and in the field. It is very convenient for making harnesses, branching off a connection sideways, and separating a narrow tape cable from a wider cable stock.

A modification of FIGURE 4 applied to the particular case of a twin cable is shown in FIGURE 5. Here both sheaths are to the same hand though one is inverted in relation to the other so as to bring the overlapping legs 18c, 18d on opposite faces. Here again there are two layers of insulation on both faces and between the two strands and in addition the cable is held together on both faces. It suffices to provide a welded or adhesive joint at 19a, 19b.

All of the structures of FIGURES 3, 4 and 5 can be secured on a wide ribbon or between two such ribbons and/or be provided with a coating of pressure sensitive adhesive. This wide ribbon is shown in FIGURES 3 and 4 but it is not an essential though often a desirable addition. The enveloped strands are united into a flat cable by virtue of the overlapping legs of the sheaths. Variations may be made in the number of layers in the sheaths and in the width of the overlaps.

The enveloping of the strands in the sheaths in cables of the sections shown in FIGURES 1 to 5 and variations thereof can be made by the use of a machine on the lines illustrated in FIGURES 6 and 7. Only the enveloping of one strand is shown and both the film and crimped foil strand are shown as coming from respective stock rolls 21, 22. It will here be assumed that the film is of "Melinex."

The film is drawn by the action of feed rollers 23 from the roll 21 between a rubber covered roller 24 and a hard roller 25 which coact to form two longitudinal creases in the film along the two lines on which it is subsequently folded. The positions and width of the rollers 24, 25 will be suited to the particular arrangement of sheath to be produced. As shown the roller 25 is asymmetrically placed for the production of a sheath disposed about the strand as in FIGURES 3 and 4.

The foil strand is led from the roll 22 over a guide roller 26 pressing it on to the upper face of the film between the creases and the film with the strand then passes a folding die 27 of the type used for example for edge binding of drawings with adhesive tape (such as the die used in the "Scotch Edger"). A blade not shown may hold the foil strand down over the region where the first upward fold of the film is made, but with the presence of the guide roller 26 and the adhesive applying rollers referred to below such a blade can usually be dispensed with. The die 27 completes the folding of one margin of the film over the upper surface of the strand, and a narrow strip of adhesive is applied to the folded-over margin from a trough 28 by a system of rollers 29 the width and location of the strip of adhesive being determined in known manner by a doctor bar 31.

The film now reaches a second folding die 32 similar to the die 27, which folds the other margin of the film over the first and the completely folded film with the enveloped strand passes between pressure rollers 33 which press the overlapped layers of the film into good contact. A blade may be used during the first part of the folding by the die 32, but the presence of the adhesive applying rollers 29 and pressure rollers 33 makes this usually unnecessary.

With an insulating film of "Melinex" or other plastic with similar properties the sheath and strand now pass over a heated channel 34 by which the film is briefly but intensively heated, thereby being shrunk on to the strand and firmly set, and the enveloped strand is wound on to a stock roll 35 for storage until it is to be united with other enveloped strands, and supporting or enclosing strips if any, into a flat cable. Tension is applied to the film throughout its passage through the machine the main tension in the heat shrinking stage being exerted by the stock roll 35.

Alternatively to the two dies 27, 32, three dies may be used, the first folding the film into a U form (with unequal legs in this particular example), and the other two folding the legs of the U over in succession similarly to the dies 27 and 32.

Other alternatives to the above described procedure include the application of the adhesive to an appropriate width of the upper face (as seen in FIGURE 7) of the second margin of the film before it is folded over by the die 32, or even the completion of the folding by the dies and the subsequent prising open of the overlapped layers after leaving the last die, the adhesive then being dripped in after which the layers are pressed together again.

The adhesive used is preferably a solventless liquid adhesive which cures by a heat cycle conveniently carried out with the re-reeled cable during storage. Epoxy resin or synthetic-rubber-based adhesives are preferred for use with Melinex film. An example of the former is "Araldite 105" with suitable hardener, examples of the latter are based on "Hycar 1312" or on "Neoprene F.B."

Solventless adhesives have the advantage of not requiring a drying path. In order to obtain a very thin adhesive layer they have to be applied at a temperature and composition at which they are very fluid. In this condition, however, they are often difficult to confine to the area desired to be coated. This difficulty has been overcome by using a thixotropic agent of large surface area, such as silica, with the adhesive and applying it at a temperature near to that at which the viscosity/temperature curve for the adhesive has its minimum.

A particularly preferred way of applying the solventless adhesive is to form it into a bar and smear the adhesive in the desired width on to the film passing under the bar by applying a constant weight or pressure to the bar while heating the film at the region of application or the end of the bar so as sufficiently to soften the solid adhesive. The dimensions of the bar are made to suit the desired width of the smear line. A convenient shelf-life for the bars can be obtained by careful selection of the hardeners available for the resin, if the adhesive requires such hardeners.

When asbestos tapes, glass fibre or quartz fibre tapes are used as the insulating film enveloping the foil strands, for high-temperature flat cables, a refractory cement is applied which sets as a thin brittle layer between the overlapped legs of the enveloping strip. In order to maintain the flexibility of the flat cable the enveloped strands are taken round rollers of very small diameter whereby the brittle cement layer is broken into narrow flakes, the cracklines running in the main across the foil strand. This discontinuous bond and the crimping of the foil permit the bending of the cable in its own plane and of its flexing perpendicular to its plane.

A variety of ceramic cements, maintaining high bond strength up to very high temperature, are commercially available.

Instead of joining the overlapped parts of the sheath by adhesive, if the nature of the film permits, they may be joined by welding.

The welding may be done by passing the enveloped foil strand through a plastic-welding tool positioned after the last folding die. The welding tool is of such construction that it first heats the overlapped margins of the film passing through it and holds them under pressure until the joint has cooled down to a safe temperature. The heating can be done either by earthing the foil and connecting the first pressure part of the welding tool to a suitable high-frequency supply, or by impact heat sealing by means of an electrically heated band exerting pressure on the foil by virtue of the latter being guided along a curved surface. Only the first part of the band is heated by an electric current along its centre line, the current flowing between two brush contacts. The second part only holds the seal under pressure and cools down rapidly.

Both welding methods which work perfectly with various plastic films are, however, very critical with Melinex film, and the further step of imparting ultrasonic vibration to the heating part of the welding tool may be used particularly for welding this film.

Pretreatment of the "Melinex" film with benzyl alcohol is also helpful in achieving a good weld.

Instead of drawing the foil strand of required width from stock rolls such as 22, a wide foil band may be continuously slit into narrow strands which pass each to an enveloping assembly (such as that of FIGURES 6 and 7) and the individual insulating films may also be produced by slitting a wider band. The several enveloped strands may be rolled up and stored and be supplied commercially to others for assembly (with other components if desired such as supporting or covering strips) into flat cables or they may be united into a flat cable in the same machine in which the strands have been enveloped in the sheaths.

When the whole of the operations of slitting, enveloping and forming into a cable are performed in a single machine. This is preferably done in a wide width made up from one or several widths of foil totaling the entire width of the cable. The minimum number of stock reels of insulating material used is determined by the factor by which the width of the foil strand has to be multiplied in order to give the width of the enveloping film. In the examples above described employing folding this factor is three or four; for the simplest envelopes described below it is two. The excess over an integral multiple to provide for the thickness of the foil, folding and clearance is accommodated by using a slightly narrower foil than corresponding with the width of the machine, but full machine width for the stock rolls of insulating material. Films and foils of different material, width and thickness can be used side by side and on the various stock rolls, and cables of any combination of these foils and films with strands of any width can be produced in the same run.

The machine consists of at least one stock roll and slitting device for the foil or foils reeled up side by side and one stock roll and slitting device for each film reel. The slit foil strands are crimped and slightly separated both laterally and in a direction perpendicular to the length of the foil so that each strand can be fed to a respective film web which at this juncture has already been slit from the wide stock. Each foil strand and film strip then passes through the same creasing, folding, welding or bonding devices such as have already been described with reference to FIGURES 6 and 7 for the production of a single enveloped strand and are subsequently guided together into a single plane for joining up into the multi-core flat cable.

Here a noteworthy difference occurs between the types of enveloped strand which have no protruding film edge (film width up to three times foil strand width, FIGURES 1 and 3) and the type with a protruding film edge (film width four times foil strand width or more, FIGURES 4 and 5). In the former type the enveloped strands are taken into one plane side by side and joined by bonding or welding the overlapping portions of the sheath as in FIGURE 3 or a further, linking film or foil such as 13 FIGURE 1 on to one side, or sandwiching or laminating the parallel strands between two such films or foils. In the latter type, if it is to be as in FIGURE 4 or 5 it is important to take the enveloped strands into the cable plane in a certain order, namely with alternate strands, say the odd numbered strands, first. The remaining strands i.e. the even numbered strands are then guided into the plane so that they come to lie on the protruding film legs of the odd numbered strands, the enveloping of both sets of strands having been effected in opposite directions as above mentioned. Thus the foil strands will have been fed in on top of the film strips for the even numbered strands, while they will have been fed in below their corresponding film strips for the odd numbered strands.

It will be understood that the bonding or welding of the individual enveloped strands to the linking film or between two such films, or to one another can be effected by the provision in the machine of similar devices to these above described for bonding or welding the margins of the sheath together.

Another method of enveloping the individual foil strands and the resulting structure are illustrated by FIGURE 8. Here the foil strand 41, loosely sandwiched between two plastic films 42 each of which is at least slightly wider than the foil strip, is guided past two very hot cutting tools distanced apart slightly more than the width of the foil strand while exerting a vigorous forward pull on the films. The hot tools, which can be thin wires heated by an electric current or heated sharp edged knives or discs, simultaneously cut the films and bead seal them together at 43 around the foil strand. This method of making the sheath is limited to insulating films which can be bead-sealed; this means it is in practice limited to thermo-plastic films, material impregnated with thermo-plastics or textile films consisting of thermo-plastic fibres. "Melinex" film and nylon tape naturally belong to this class. FIGURE 8 assumes the two hot tools to be set at an inclination indicated by the chain lines C but other attitudes are possible, for example perpendicular indicated by the chain lines P or outwardly inclined indicated by the chain lines O.

Yet another possibility in which the two edges of each strand are differently treated, is a combination of folding at one edge and bead-sealing at the other. This is illustrated by FIGURES 9, 10 and 11. Here two foil strands 44 one beside the other with a small gap between them are fed through the machine while superimposed symmetrically on a plastic film 45 of twice the width of both foil strands and the width of the gap so that the plastic film protrudes beyond the outer edges of the two strands by more than the strand width on each side, see FIGURE 9. These margins are first folded over their adjacent foil strands as in the method above described method with reference to FIGURES 6 and 7 and the two strands are then separated by a hot disc or other bead-sealing tool which simultaneously welds the folded over top part of the film along the inner edges of the two foil strands and cuts the film in the gap. It is, of course, possible to work with a wider gap, use two bead sealing tools and salvage the plastic film cut-off in the gap. In any case, the result is two foil strips enveloped in sheaths both of which are folded on one edge and bead sealed on the opposite edge.

Bead sealing whether at one or both edges can be facilitated or improved by imparting ultrasonic vibrations during the sealing operation.

FIGURE 12 illustrates provision for the insertion of bridge pieces (short cross connections) at intervals to produce a meander or similar conductive pattern or connect a number of strands in parallel, for example when a length of the cable is to be used as a heating tape. Here at each such interval a loop which is folded flat before the strand is enveloped is produced by making two folds 51a, 51b in the strand 51. If now a length of cable is cut off the stock at two such locations so as just to clear the folds 51a, i.e. at the locations of the chain lines CL, if the sheath is cut the bridges can be inserted between the two folded loops of the strands to be interconnected. To facilitate the connection the surfaces of the strand may be tinned before enveloping and preferably the tinning is confined to the part of the surface which is on the inside of the two folded loops. Some of the loops may be unfolded to provide terminal connections, or terminals may be inserted into the loops in the same way as for bridge pieces.

In FIGURE 13 a double loop is provided at the desired intervals by making four folds 52a, 52b, 52c and 52d in the strand 52. By cutting through at the chain line CLa each end of the severed piece of cable is left with a loop such as the above described with reference to FIGURE 12 with the same possibilities of interconnection and terminal connection.

In both examples when the bridge pieces 44 have been inserted, any opened sheaths may be folded down and covered with a piece of self-adhesive insulating tape or the like as shown in FIG. 24.

FIGURE 24 illustrates such a structure using the material of FIGURES 9, 10 and 11. Thus, this figure shows pairs of neighboring strands 44 interconnected at opposite ends by inserted bridge pieces and a piece of self-adhesive insulating tape which has been applied to cover the sheaths 45 which have been opened to gain access to the strands 44 to insert the bridge pieces.

FIGURE 14 illustrates how the extensibility of the sheaths can be restricted or controlled. To this end a filament such as a fibrous thread 54 is incorporated in the bond between the overlapped margin 55, 56 of the sheath. This thread can be precoated with the adhesive used for bonding the margin of the sheath and its insertion can serve for effecting the bonding. Alternatively it can be welded in. If preferred a metallic wire can be used which remains in the cable and this can then be used as a safety device. Thus it can carry a control current, breaking of the wire then serving for instance to actuate means for breaking the supply to the cable itself. In FIGURE 14 the sheath is shown of the same form as in FIGURE 1 but manifestly such a filament can be provided with any of the forms of sheath shown in FIGURES 3 to 5.

Where the cable is to be used as a heating cable the necessary meander or similar pattern can be formed before the individual strands are enveloped. In such a cable, the foil strands are linked at regular intervals by bridges which are either integral with the foil or arise from the foil strands being joined to each other directly or by metallic parts prior to the enveloping operation. The essential difference between this embodiment and those above described which may be referred to as the parallel line-cable is the difference of enveloping procedure necessitated by existence of the bridges. All strands of the meander pattern must be enveloped in the same run; the production cannot efficiently be split up by enveloping single strands and joining them into a multi-core cable later, and the enveloping insulating films must have cut-outs in register with the bridges. The foil strands are enveloped over their length between the bridges, the latter places are primarily only insulated on one side, the other if not covered by the overlapping portion of the neighbouring sheaths is preferably covered by a piece of self-adhesive insulating tape.

The foil of full width is processed to produce the required pattern, for example long narrow slots in alternately staggered arrangement as to be seen in FIGURE 21 will give a sequence of meander paths in parallel across the foil from one margin to the other, the margins serving as terminals for the parallel paths. Ideally the slots should be produced by merely slitting the foil and folding back or similarly dealing with a sufficient margin to produce slots wide enough to accommodate the insulating sheaths. But the whole of the slot can be cut away if preferred. This may be done by punching and feeding the foil in steps, or by the aid of a patterned roller and counter roller by which the material of the slots is sheared away. The foil is also crimped before enveloping either before or after slotting as may be more convenient.

In FIGURE 15 the sheaths are made from a single wide film at least three times the width of the foil, folded into loops 62 which are pressed together and which register with the slots in the foil 63. These folds are passed up through the slots, for example by leading the foil in a path converging with that of the insulating film. At the necessary intervals, the folded parts are cut out to clear the bridges.

When the foil and insulating film have been brought into the relative position shown in FIGURE 15 the loops projecting above the surface of the foil are all folded down to one side, e.g. to the left as in FIGURE 16. On account of the width of the film, the folded parts overlap so that each strand is completely enveloped in a sheath and by bonding the overlapped parts with adhesive or welding them linking of the insulation is obtained on this face of the cable. The amount of overlap is directly proportional to the width of the film and can be given any desired value.

In FIGURE 17, two single strips 64, 65 are introduced into the slots in the foil 66 from opposite sides, each being cut away from the leading edge to clear the bridges. Those parts projecting on one side are folded down to one side and those on the other to the other side and the width of the two strips made such as to provide an overlap, see FIGURE 18, which is then bonded or welded so that again each strand is completely overlapped in a sheath. This necessitates that each strip should be at least twice the width of the foil strands but it can be made greater if desired.

In both FIGURES 16 and 18 there are again two thicknesses of film between edges of adjacent strands.

In FIGURE 16 the film is continuous in the length on the underside and provides a single layer over the whole cable while on top though each fold is interrupted at the bridges since the bridges are relatively staggered laterally each bridge is covered by the fold from the next slot. Thus on top there are at least two layers of film everywhere and four layers in most parts.

In FIGURE 18 since one of the strips is continuous on each side, both sides are completely covered by a single layer and by a double layer in most parts and the cable is secured together on both sides.

Another possibility is to use separate doubled strips, inserted from one side (as in FIGURE 15 but only halfway through) and then folded over to opposite sides as in FIGURE 18. In some cases it may suffice to insert single strips, giving thinner coverings top and bottom.

Another possibility giving thinner coverings top and bottom but even greater insulation between the edges of the strands is shown in FIGURES 19 and 20. Here a single strip 67 of film is folded into a short flattened Z formation 68 this formation lying in the slots in the foil 69 so that here there are three layers of film between adjacent edges. As before the film is folded down to opposite sides on top and below, overlapped and bonded or welded. Equal width above and below are shown but this is not essential.

Separate film strips as in FIGURES 18 and 20 also permit variations in the number of strips and thus of the number of layers between adjacent edges of the strands and in the number of layers on top and below. In all cases a filament as in FIGURE 14 can be embedded in the overlapped joints or some of them. Also any of those cables can have an additional film secured on one face or be sandwiched between two such layers.

The folding over of the film to either side on top and underneath as in FIGURES 18 and 20 can in principle be effected as illustrated in FIGURE 21. The foil 71 after slotting and the insertion of the film, travels in the direction of the arrow 72 in relation to two folding members 73, 74 respectively set closely above and below the foil and having their folding edges set at a small angle (the drawing shows the angle at too high a value in order to keep the figure within bounds). These folding edges will cause the upstanding film to be laid over and the foil with the laid over film may be passed between pressure rollers. If adhesive is used this may be applied at any convenient stage. If welding is employed this will be effected after passing the members 73, 74.

In the present invention, in every case the insulating film can be made by means best suited for producing the film without the complication of forming it on a metal foil or wire and it is available before the production of the cable according to the invention even begins. It can therefore be selected from pre-tested stock and all its qualities constitute given precise data, not specified values it is hoped to achieve by the operations involved in the production of the cable.

It is therefore possible to choose films of higher strength, better insulating properties, better uniformity and smaller thickness with less pinholes than can be expected from a film extruded or otherwise formed over the foil strand. The enveloping is done without bonding the foil continuously to the film; only the envelope is sealed by welding or bonding the film together preferably along the overlapping edges.

The foil strand is able to move freely within the envelope or has a chosen degree of mobility by selective bonding between film and foil at spaced points only. This is not only desirable because of the difference in temperature coefficients of expansion of foil and insulating sheath but also for mechanical and other reasons as described below. The relative mobility of the foil inside the envelope can be enhanced by coating the foil or the insulating film surface which forms the inside of the envelope with a lubricating agent or treating the insulating envelope with a friction reducing vapour which also inhibits certain forms of corrosion. Vapour is particularly recommended for textile type insulating films.

The foil is preferably crimped so as to be more extensible than the film envelope. Stress applied to the cable can therefore be taken by the film envelope without tearing the foil. If necessary the extensibility of the envelope is controlled as described with reference to FIGURE 14. Alternatively, it can be arranged by suitable choice of the extensibilities of the film and foil that for purposes of safety in certain applications, the foil breaks before the film is extended to breaking point.

The elasticity of the crimped foil within the film envelope not only permits the flat cable to be flexible to some degree even in its own plane, but also permits the foil to be under sufficient tension to retract elastically a little on both sides of any break which occurs in the foil strand. This automatic widening of the gap limits the danger of any arc at a break in the foil strand.

The provision of an enveloping structure with two film thicknesses between and over the foil strands eliminates danger due to pinholes, as it is highly improbable that rare, occasional pinholes in the two film areas will become superimposed.

It is well known that there is no ideal electrical insulating material available. Most of the plastic insulating films fail, for instance either in heat-endurance, or water- or flame-resistance. The preferred Melinex film loses its bond strength to epoxy resin adhesive on prolonged immersion in boiling water and is not flame resistant. It is therefore proposed by the present invention either to pre-treat the film in order to remedy these failings or to enclose the whole cable in a protective sheath.

The pre-treatment of the Melinex film in order to render its bond to epoxy resins resistant to boiling water can consist in passing it slowly through a hot sodium hydroxide solution in water or coating with Accobond resins.

A preferred method of pre-treatment is one in which one side of the film, the side which becomes the outside of the envelope of the foil strand, is coated with a layer which improves both humidity and flame resistance at the same time. Highly chlorinated, heat and water resistant paints are suitable for this purpose, such as latex emulsions of "neoprene" or "Hypalon." A coating composition which has been found particularly successful after extensive trials, consists of silicone rubber, antimony trioxide and "Aroclor," a chlorinated polyphenyl. With reference to the foregoing the surface layers are flame retardant by virtue of a high halogen content.

Where the cable is to be metal clad or to be used as an armoured cable, that is within a sheath of steel or aluminium foil, the problem does not arise as long as proper protective fuses are provided at the cable terminals. Such fuses can be incorporated in the terminal link between the flat cable and a flexible cable carrying mains supply voltage which in some instances must be of a standard type made with insulated wires to suit present habits and fittings, and it may include a foil fuse for every foil strand or one fuse for every circuit of the flat cable. The terminals are preferably insulated by a self-adhesive tape which anchors the flexible cable to the insulation or metal cladding of the flat cable, whereby it relieves the foil strands or connections from any stress.

An example is illustrated in FIGURE 22 in which the crimped foil cable strand is again marked 11 and the insulating sheath 12. The figure shows the strand conductively attached to the terminal connection and the latter anchored to the outside of the cable by insulating tape, thus avoiding the transmission of stresses between the terminal connection of the strand.

In order to make electrical connections to the foil strands either for connecting them to a supply or for interconnecting them to form parallel or meandering conductive paths the enveloping film in some constructions of the flat cable has to be locally removed on at least one side of the foil strands. The fact that the foil is only enveloped in and not bonded to the film makes this task a very easy and clean one and avoids the need to scrape the foil bare which might easily damage it if it is very thin. The film can be cut and peeled off with a pocket knife or "welded" off by taking a hot wire or a fine-edged hot soldering iron along a straight edge across the flat cable thus melting and cutting the Melinex or other plastic film along a line.

A particular advantage of the flat cable is the possibility of coating one or both sides with an adhesive such as a pressure sensitive adhesive, and thus of permitting a wide selection of cladding films or foils to be applied by the user. This facility reduces the number of flat cable constructions which the manufacturer must keep in stock for ready supply of the market.

A standard flat cable core consisting of enveloped foil strands linked together as described and coated with pressure sensitive adhesives is proposed as an intermediate product to be marketed both for making up into final cables and for applications where the cable can be adhesively fixed to a surface of a wall or other material with some advantage for surface heating or current conduction.

I claim:

1. An electric flat cable comprising at least one layer of a plurality of parallel longitudinal thin flat flexible conductive strands in edge to edge disposition, respective similar sheaths of prefabricated thin flexible insulating material completely enveloping the strands and joined together and having a total width of insulating material at least twice the total width of the conductive strands, at least a major part of the surface of the conductor strands being free to move longitudinally relatively to the sheaths, there being no zones of adhesion between the strands and the sheaths long enough to impair substantially the longitudinal mobility of the strands in relation to the sheaths over the major part of the lengths of the strands and there being no zones of adhesion between the strands and sheaths at distances short enough to result in contact between the strands if the strands without the sheaths were flexed in their own plane to the limit of their endurance, and the mobility of the conductive strands inside their insulating sheaths being enhanced by the presence of a lubricating agent extending at least over a part of one of their contacting surfaces.

2. An electric flat cable comprising at least one layer of a plurality of parallel longitudinal thin flat flexible conductive strands in edge to edge disposition, respective similar sheaths of prefabricated thin flexible insulating material completely enveloping the strands and joined together and having a total width of insulating material at least twice the total width of the conductive strands, at least a major part of the surface of the conductor strands being free to move longitudinally relatively to the sheaths, there being no zones of adhesion between the strands and the sheaths long enough to impair substantially the longitudinal mobility of the strands in relation to the sheaths over the major part of the lengths of the strands and there being no zones of adhesion between the strands and sheaths at distances short enough to result in contact between the strands if the strands without the sheaths were flexed in their own plane to the limit of their endurance, said cable being for use as a heating element in which unit lengths of at least single adjacent conductive strands are electrically connected at alternate ends of these unit lengths so that the conductive strands form a meander path for electric current supplied to the terminals of the cable, and the places of connection of the adjacent conductive strands are enveloped by additional insulating material.

3. An electric flat cable comprising at least one layer of a plurality of parallel longitudinal thin flat flexible conductive strands in edge to edge disposition, respective similar sheaths of prefabricated thin flexible insulating material completely enveloping the strands and joined together and having a total width of insulating material at least twice the total width of the conductive strands, at least a major part of the surface of the conductor strands being free to move longitudinally relatively to the sheaths, there being no zones of adhesion between the strands and the sheaths long enough to impair substantially the longitudinal mobility of the strands in relation to the sheaths over the major part of the lengths of the strands and there being no zones of adhesion between the strands and sheaths at distances short enough to result in contact between the strands if the strands without the sheaths were flexed in their own plane to the limit of their endurance, and the conductive strands being of metal foil with fine crimps across the width whereby they are rendered longitudinally elastic and reduced in length compared with the foil in the flat.

4. An electric flat cable according to claim 3 in which the sheaths of the conductive strands are of such extensible material that the cable is also flexible in its own plane to at least a moderate degree.

5. An electric flat cable comprising at least one layer of a plurality of parallel longitudinal thin flat flexible conductive strands in edge to edge disposition, respective similar sheaths of prefabricated thin flexible insulating material completely enveloping the strands and joined together and having a total width of insulating material at least twice the total width of the conductive strands, at least a major part of the surface of the conductor strands being free to move longitudinally relatively to the sheaths, there being no zones of adhesion between the strands and the sheaths long enough to impair substantially the longitudinal mobility of the strands in relation to the sheaths over the major part of the lengths of the strands and there being no zones of adhesion between the strands and sheaths at distances short enough to result in contact between the strands if the strands without the sheaths were flexed in their own plane to the limit of their endurance, and the conductive strands being elastic and held under slight tension in the cable so that in case of a rupture the broken ends of the conductor strand retract and widen the gap between them.

6. An electric flat cable comprising at least one layer of a plurality of parallel longitudinal thin flat flexible conductive strands in edge to edge disposition, respective similar sheaths of prefabricated thin flexible insulating material completely enveloping the strands and joined together and having a total width of insulating material at least twice the total width of the conductive strands, at least a major part of the surface of the conductor strands being free to move longitudinally relatively to the sheaths, there being no zones of adhesion between the strands and the sheaths long enough to impair substantially the longitudinal mobility of the strands in relation to the sheaths over the major part of the lengths of the strands and there being no zones of adhesion between the strands and sheaths at distances short enough to result in contact between the strands if the strands without the sheaths were flexed in their own plane to the limit of their endurance, and at least one sheath also including a filament extending longitudinally and bonded to the sheath, this filament having a lower extensibility than the sheath.

References Cited by the Examiner
UNITED STATES PATENTS

| | | | |
|---|---|---|---|
| 2,028,715 | 1/1936 | Hanson | 174—121 |
| 2,158,496 | 5/1939 | George | 174—117 |
| 2,393,182 | 1/1946 | Newell | 219—541 X |
| 2,526,483 | 10/1950 | Ingmanson | 175—117 |
| 2,544,503 | 3/1951 | Kennedy. | |
| 2,626,303 | 1/1953 | Link | 174—117 |
| 2,695,329 | 11/1954 | Sabine | 174—126 |
| 2,749,261 | 6/1956 | Hardison. | |
| 2,934,586 | 4/1960 | Gesell | 174—88 X |
| 2,950,338 | 8/1960 | Taylor | 174—117 X |
| 3,022,907 | 5/1962 | Eisler | 219—549 |
| 3,033,970 | 5/1962 | Eisler | 174—117 |

FOREIGN PATENTS

| | | |
|---|---|---|
| 685,732 | 1/1953 | France. |
| 553,448 | 2/1923 | France. |

LEWIS H. MYERS, *Primary Examiner.*

B. G. MILLER, J. P. WILDMAN, E. JAMES SAX, J. BURNS, K. R. PETERSON, W. F. ZAGURSKI, D. A. KETTLESTRINGS, H. HUBERFIELD,
*Assistant Examiners.*